US012718481B2

(12) United States Patent
Doggett et al.

(10) Patent No.: US 12,718,481 B2
(45) Date of Patent: Aug. 25, 2026

(54) MEMORIES FOR VIRTUAL CHARACTERS

(71) Applicants: DISNEY ENTERPRISES, INC., Burbank, CA (US); ETH Zürich (Eidgenössische Technische Hochschule Zürich), Zürich (CH)

(72) Inventors: Erika Varis Doggett, Los Angeles, CA (US); Fabian Jonas Landwehr, Zürich (CH); Romann Matthew Weber, Uster (CH)

(73) Assignees: Disney Enterprises, INC., Burbank, CA (US); ETH Zürich (Eidgenössische Technische Hochschule Zürich), Zürich (CH)

(*) Notice: Subject to any disclaimer, the term of this patent is extended or adjusted under 35 U.S.C. 154(b) by 135 days.

(21) Appl. No.: 18/671,209

(22) Filed: May 22, 2024

(65) Prior Publication Data

US 2024/0394965 A1 Nov. 28, 2024

Related U.S. Application Data

(60) Provisional application No. 63/503,686, filed on May 22, 2023.

(51) Int. Cl.
*G06T 17/00* (2006.01)
*G06T 13/40* (2011.01)

(52) U.S. Cl.
CPC .............. *G06T 17/00* (2013.01); *G06T 13/40* (2013.01)

(58) Field of Classification Search
CPC ......... G06T 17/00; G06T 13/40; G06N 3/006; G06N 20/00; G06F 40/56
See application file for complete search history.

(56) References Cited

U.S. PATENT DOCUMENTS 10,991,369 B1 * 4/2021 Borisov .................. G06F 40/30
2019/0087707 A1 * 3/2019 Cummins ........... G06F 16/3329
2020/0151765 A1 * 5/2020 Ogawa .................... G10L 15/22
(Continued)

OTHER PUBLICATIONS

Moon et. al. "Memory Grounded Conversational Reasoning", Proceedings of the 2019 EMNLP and the 9th IJCNLP (System Demonstrations), pp. 145-150 Hong Kong, China, Nov. 3-7, 2019. c 2019 Association for Computational Linguistics, (Year: 2019).*
(Continued)

*Primary Examiner* — Maurice L. McDowell, Jr.
(74) *Attorney, Agent, or Firm* — Squire Patton Boggs LLP; Sarah Mirza

(57) ABSTRACT

One embodiment of the present invention sets forth a technique for synthesizing an interaction with a virtual character. The technique includes matching a first message from a user to a first set of memories associated with the virtual character and determining at least a portion of the first set of memories based on a plurality of factors associated with the first set of memories. The technique also includes inputting a first prompt that includes (i) one or more instructions associated with the virtual character, (ii) the at least a portion of the first set of memories, and (iii) the first message into a machine learning model. The technique further includes generating, via execution of the machine learning model based on the first prompt, a first response by the virtual character to the first message, and causing the first response to be outputted to the user.

20 Claims, 6 Drawing Sheets

(56) References Cited

U.S. PATENT DOCUMENTS

2022/0068462 A1* 3/2022 Dolan .................... G10L 25/63
2023/0409839 A1* 12/2023 Yarabolu .............. G06F 40/205
2024/0269566 A1* 8/2024 Howard ................. A63F 13/67

OTHER PUBLICATIONS

Adamopoulou et al., "An Overview of Chatbot Technology", International Federation for Information Processing, https://doi.org/10.1007/978-3-030-49186-4_31, 2020, pp. 373-383.
Baddeley, Alan, "Working Memory", Science, DOI: 10.1126/science.1736359, vol. 255, Jan. 31, 1992, pp. 556-560.
Bender et al., "On the Dangers of Stochastic Parrots: Can Language Models Be Too Big?", Fairness, Accountability, and Transparency, https://doi.org/10.1145/3442188.3445922, Mar. 3-10, 2021, pp. 610-623.
Borgeaudy et al., "Improving Language Models by Retrieving from Trillions of Tokens", arXiv:2112.04426, Feb. 7, 2022, pp. 1-43.
Brown et al., "Language Models are Few-Shot Learners", arXiv:2005.14165, Jul. 22, 2020, 75 pages.
Ebbinghaus, Hermann, "Memory: A Contribution to Experimental Psychology", Annals of Neurosciences, doi : 10.5214/ans.0972.7531.200408, vol. 20, No. 4, Oct. 2013, pp. 155-156.
Greshake et al., "More than You've Asked for: A Comprehensive Analysis of Novel Prompt Injection Threats to Application-Integrated Large Language Models", arXiv:2302.12173, Feb. 23, 2023, pp. 1-12.
Hussain et al., "A Survey on Conversational Agents/Chatbots Classification and Design Techniques", DOI: 10.1007/978-3-030-15035-8_93, Mar. 2019, pp. 946-956.
Ji et al., "Survey of Hallucination in Natural Language Generation", ACM Computing Surveys, https://doi.org/10.1145/3571730, vol. 1, No. 1, Feb. 2022, pp. 1-59.
Khandelwal et al., "Generalization Through Memorization: Nearest Neighbor Language Models", ICLR, arXiv:1911.00172, Feb. 15, 2020, pp. 1-13.
Lan et al., "A Survey on Complex Knowledge Base Question Answering: Methods, Challenges and Solutions", arXiv:2105.11644, May 25, 2021, 10 pages.
Lehman et al., "Turn-Taking, Children, and the Unpredictability of Fun", Association for the Advancement of Artificial Intelligence, https://doi.org/10.1609/aimag.v37i4.2685, vol. 37, Issue 4, Dec. 1, 2016, pp. 55-62.
Leite et al., "Persistent Memory in Repeated Child-Robot Conversations", DOI: http://dx.doi.org/10.1145/3078072.3079728, IDC '17, Jun. 27-30, 2017, 10 pages.
Levine et al., "Standing on the Shoulders of Giant Frozen Language Models", arXiv:2204.10019, Apr. 21, 2022, pp. 1-19.
Madotto et al., "Personalizing Dialogue Agents via Meta-Learning", Proceedings of the 57th Annual Meeting of the Association for Computational Linguistics, Jul. 28-Aug. 2, 2019, pp. 5454-5459.
"GPT-4 Technical Report", OpenAI, arXiv:2303.08774 Mar. 6, 2024, pp. 1-100.
Paetzel-Prüsmann et al., "Improving a Robot's Turn-Taking Behavior in Dynamic Multiparty Interactions", ACM/IEEE International Conference on Human-Robot Interaction, https://doi.org/10.1145/3568294.3580117, Mar. 13-16, 2023, 5 pages.
Park et al., "Generative Agents: Interactive Simulacra of Human Behavior", UIST, https://doi.org/10.1145/3586183.3606763, Oct. 29-Nov. 1, 2023, 22 pages.
Patterson et al., "Carbon Emissions and Large Neural Network Training", https://doi.org/10.48550/arXiv.2104.10350, 2024, pp. 1-22.
Sharir et al., "The Cost of Training NLP Models: A Concise Overview", https://doi.org/10.48550/arXiv.2004.08900, Apr. 19, 2020, 6 pages.
Sukhbaatar et al., "Augmenting Self-attention with Persistent Memory", arXiv:1907.01470, Jul. 2, 2019, 11 pages.
Thorne, Avril, "Personal Memory Telling and Personality Development", Personality and Social Psychology Review, vol. 4, No. 1, 2000, pp. 45-56.
Thue et al., "Interactive Storytelling: A Player Modelling Approach", Association for the Advancement of Artificial Intelligence, 2007, pp. 43-48.
Vaswani et al., "Attention Is All You Need", 31st Conference on Neural Information Processing Systems, arXiv:1706.03762, Aug. 2, 2023, pp. 1-15.
Wang et al., "Retrieval, Re-ranking and Multi-task Learning for Knowledge-Base Question Answering", Proceedings of the 16th Conference of the European Chapter of the Association for Computational Linguistics, Apr. 19-23, 2021, pp. 347-357.
Wei et al., "Chain-of-Thought Prompting Elicits Reasoning in Large Language Models", 36th Conference on Neural Information Processing Systems, arXiv:2201.11903, Jan. 10, 2023, 43 pages.
Weizenbaum, Joseph, "ELIZA—a Computer Program for the Study of Natural Language Communication Between Man and Machine", https://doi.org/10.1145/365153.365168, Communications of the ACM, vol. 9, Issue 1, Jan. 1, 1966, pp. 36-45.
Welleck et al., "Dialogue Natural Language Inference", Proceedings of the 57th Annual Meeting of the Association for Computational Linguistics, Jul. 28-Aug. 2, 2019, pp. 3731-3741.
Zaib et al., "A Short Survey of Pre-trained Language Models for Conversational AI—A New Age in NLP", ACSW 2020, arXiv:2104.10810, Feb. 4-6, 2020, pp. 1-7.
Zemčík, Tomáš, "A Brief History of Chatbots", 2019 International Conference on Artificial Intelligence, Control and Automation Engineering, DOI: 10.12783/dtcse/aicae2019/31439, 2019, pp. 14-18.
Zhuo et al., "Exploring AI Ethics of ChatGPT: A Diagnostic Analysis", arXiv:2301.12867, Jan. 30, 2023, 16 pages.
Landwehr et al., "Memories for Virtual AI Characters", Proceedings of the 16th International Natural Language Generation Conference, Sep. 11-15, 2023, pp. 237-252.

* cited by examiner

MEMORIES FOR VIRTUAL CHARACTERS

CROSS-REFERENCE TO RELATED APPLICATIONS

This application claims the benefit of the U.S. Provisional Application titled "Memories for Artificial Intelligence Characters," filed on May 22, 2023, and having Ser. No. 63/503,686. The subject matter of this application is hereby incorporated herein by reference in its entirety.

BACKGROUND

Field of the Various Embodiments

Embodiments of the present disclosure relate generally to machine learning and generative models and, more specifically, to memories for virtual characters.

DESCRIPTION OF THE RELATED ART

Virtual characters have become an important part of many interactive media experiences, such as (but not limited to) video games, virtual reality, interactive robots, and/or chatbots. These experiences often involve interactions between the virtual characters and users in a conversational manner. Traditionally, such interactions have been driven by scripted dialogue trees and/or dialogue flows written by designers, with key phrases inserted into messages from the virtual characters to personalize the messages to the users. However, virtual characters that utilize dialogue trees and/or dialogue flows are limited to a predetermined set of conversational topics and unable to improvise, which can lead to interactions that feel robotic.

More recently, large language models (LLMs) and/or other types of generative models have been incorporated into interactions with virtual characters. These generative models are capable of generating text that is contextually relevant to user input, thereby allowing for more natural, dynamic, and engaging conversations. However, generative models are trained on large diverse datasets and lack grounding in a consistent character background and/or persona, which can cause the generative models to "hallucinate" output that is incorrect and/or not in line with the personality or backstory of a virtual character. Consequently, controlling the behavior of virtual characters that incorporate generative models can be difficult.

One approach to controlling the output of LLMs and other generative models involves the use of Retrieval-Augmented Generation (RAG) to supplement a generative prompt with external information that is relevant to user queries. However, these systems typically operate in a question-answer paradigm and are focused on factual knowledge instead of experiences and personality traits that inform the behavior of a virtual character during an interaction. Accordingly, interactions with virtual characters that are synthesized using conventional RAG-based approaches can also fail to fully incorporate nuances that are informed by the personalities and experiences of the virtual characters.

As the foregoing illustrates, what is needed in the art are more effective techniques for conducting interactions with virtual characters.

SUMMARY

One embodiment of the present invention sets forth a technique for synthesizing an interaction with a virtual character. The technique includes matching a first message from a user to a first set of memories associated with the virtual character and determining at least a portion of the first set of memories based on a plurality of factors associated with the first set of memories. The technique also includes inputting a first prompt that includes (i) one or more instructions associated with the virtual character, (ii) the at least a portion of the first set of memories, and (iii) the first message into a machine learning model. The technique further includes generating, via execution of the machine learning model based on the first prompt, a first response by the virtual character to the first message, and causing the first response to be outputted to the user.

One technical advantage of the disclosed techniques relative to the prior art is the ability to tailor the interaction between a user and a virtual character to different conversational topics, emotional states, user preferences, and/or virtual character personas. Consequently, the disclosed techniques allow the interaction to be more dynamic, spontaneous, and natural than existing approaches that rely on scripted dialogue trees or flows. Another advantage of the disclosed techniques is the ability to ground responses from the virtual character in memories and/or attributes of the character, thereby avoiding hallucinations and/or other inconsistencies in output from LLMs used to generate the responses. An additional technical advantage of the disclosed techniques is the adaptation of Retrieval-Augmented Generation (RAG) techniques that are used to answer factual questions to the generation of messages that are in line with the personas, experiences, and worlds of virtual characters. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
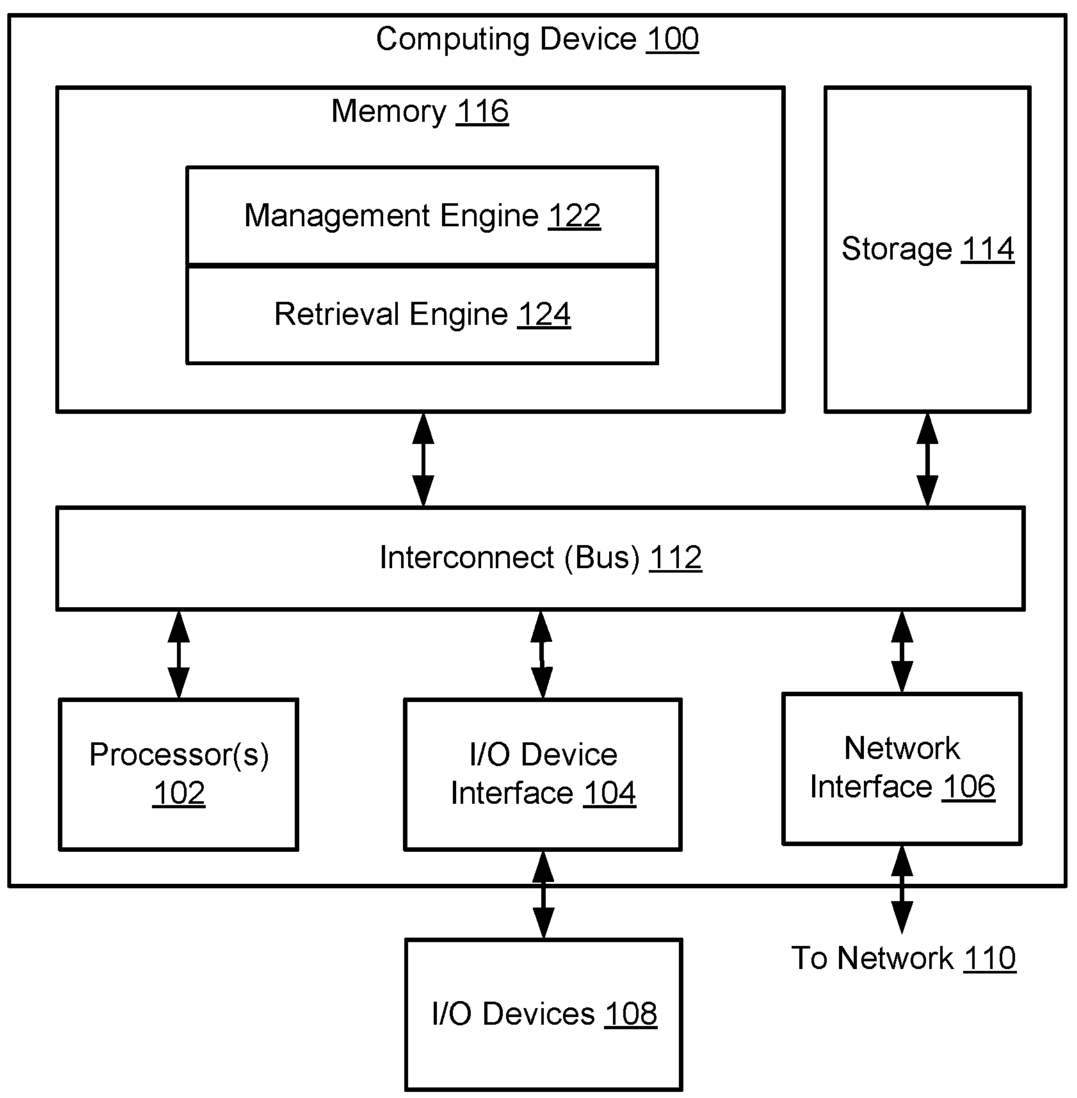
FIG. 1 illustrates a system configured to implement one or more aspects of various embodiments.

FIG. 1 illustrates a computing device 100 configured to implement one or more aspects of various embodiments. In one embodiment, computing device 100 includes a desktop computer, a laptop computer, a smartphone, a personal digital assistant (PDA), a tablet computer, or any other type of computing device configured to receive input, process data, and optionally display images, and is suitable for practicing one or more embodiments. Computing device 100 is configured to run a management engine 122 and a retrieval engine 124 that reside in a memory 116.

It is noted that the computing device described herein is illustrative and that any other technically feasible configurations fall within the scope of the present disclosure. For example, multiple instances of management engine 122 and retrieval engine 124 could execute on a set of nodes in a distributed and/or cloud computing system to implement the functionality of computing device 100. In another example, management engine 122 and/or retrieval engine 124 could execute on various sets of hardware, types of devices, or environments to adapt management engine 122 and/or retrieval engine 124 to different use cases or applications. In a third example, management engine 122 and retrieval engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) and/or a virtual computing instance executing within a computing cloud.

I/O devices 108 include devices capable of providing input, such as a keyboard, a mouse, a touch-sensitive screen, a microphone, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Management engine 122 and retrieval engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including management engine 122 and retrieval engine 124.

In some embodiments, management engine 122 and retrieval engine 124 are configured to manage an interaction (e.g., conversation) between a user and a virtual character. The virtual character may include a virtual representation of a fictitious, historical, and/or another type of character. The user can interact with the virtual character in a variety of environments and/or settings. For example, the virtual character could be represented using a chatbot, a character in a virtual world and/or game, and/or an interactive robot in a real-world setting (e.g., a theme park, store, home, etc.).

More specifically, management engine 122 and retrieval engine 124 use representations of short-term memory and long-term memory for the character as a basis for generating messages from the virtual character to the user. These messages can be generated in response to messages from the user to the virtual character and/or in a proactive manner (e.g., after the user has been inactive for a period of time). In operation, management engine 122 and retrieval engine 124 can match messages from the user to memories of the virtual character from a set of knowledge sources, prompt a large language model (LLM) and/or another type of machine learning model to generate responses to the messages using the memories and/or other information associated with the virtual character, transmit the responses to the user, and/or create new memories of interactions between the user and the virtual character. As described in further detail below, these memory-based interactions can improve the ability of the virtual character to improvise, discuss topics of interest to the user, and/or incorporate previous messages exchanged with the user into a current interaction; reduce and/or avoid inaccuracies and/or inconsistencies in the statements and/or behavior of the virtual character; and/or adapt Retrieval-Augmented Generation (RAG) techniques used with LLMs to generate messages that reflect the personas and experiences of virtual characters.

Memories for Virtual Characters

Figure 2:
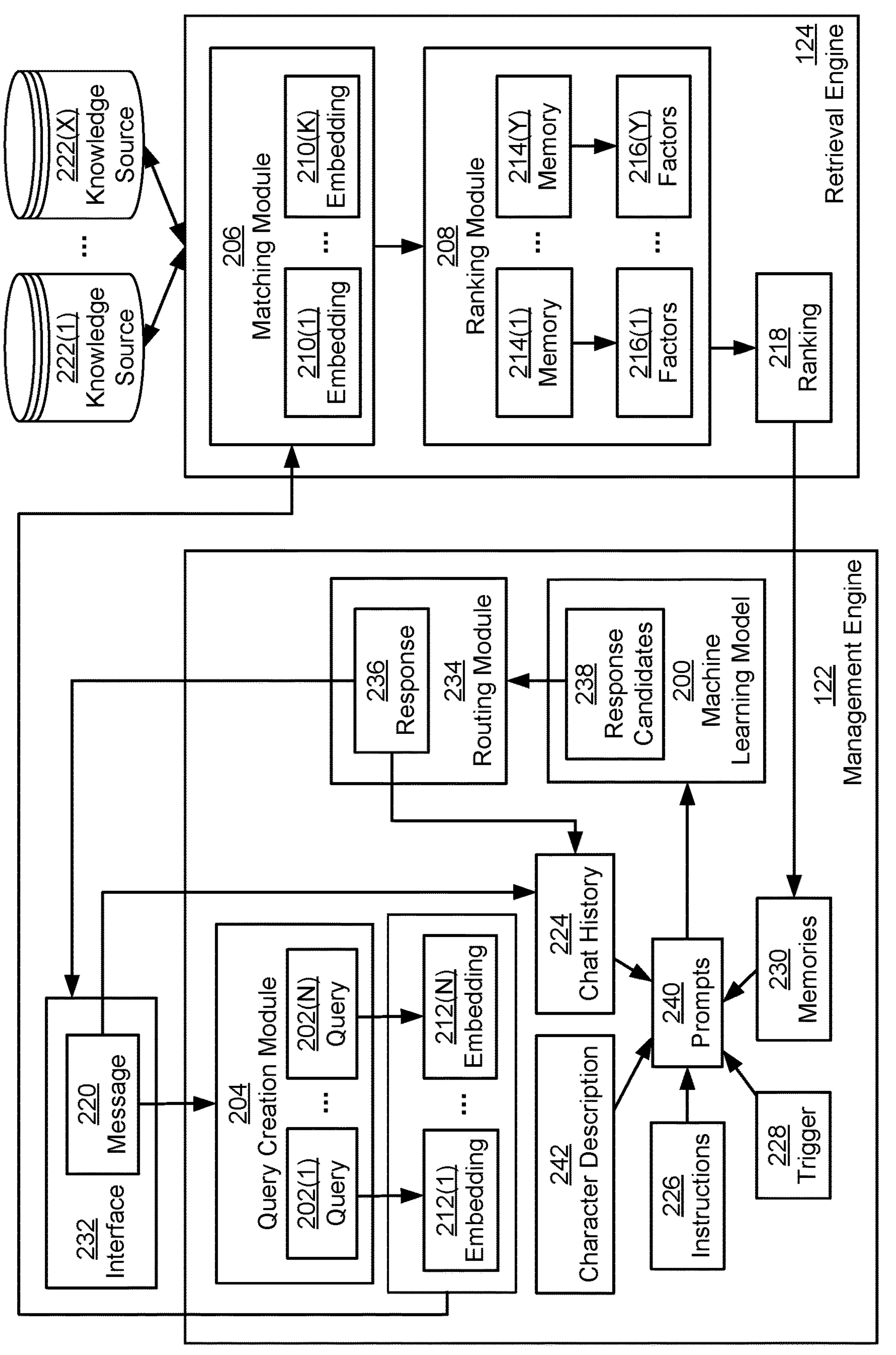
FIG. 2 is a more detailed illustration of the management engine and retrieval engine of FIG. 1, according to various embodiments.

FIG. 2 is a more detailed illustration of management engine 122 and retrieval engine 124 of FIG. 1, according to various embodiments. As mentioned above, management engine 122 and retrieval engine 124 operate to manage an interaction between a user and a virtual character. For example, management engine 122 and retrieval engine 124 could be used to conduct a conversation between the user and the virtual character.

As shown in FIG. 2, management engine 122 receives a message 220 from a user over an interface 232. For example, management engine 122 could receive message 220 over a chat interface, voice user interface, graphical user interface (GUI), and/or another type of interface 232 with the user.

In some embodiments, Interface 232 is associated with an immersive environment, such as (but not limited to) a virtual reality (VR) and/or mixed reality (MR) environment. This environment can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

Message 220 can include a text-based representation, such as (but not limited to) a chat message typed and/or dictated by the user, an utterance of the user that has been transcribed into text, and/or one or more images provided by the user that include text and/or are converted into a textual description. Message 220 can also, or instead, include other types of data. For example, message 220 could include the audio of the user's utterance; one or more images selected and/or provided by the user; a video of the user's facial expressions, gestures, and/or body movements; sensor and/or biometric data associated with the user and/or an environment of the user; and/or other information that indicates a state associated with the user and/or represents a communication from the user to the virtual character.

In some embodiments, message 220 is preceded by previous messages transmitted between the user and virtual character over one or more conversations involving the user and virtual character. These previous messages are stored in a chat history 224 associated with the user and virtual character.

Management engine 122 includes a number of components that generate and transmit a response 236 to message 220 in a manner that is consistent with the behavior and/or experiences of the virtual character. More specifically, management engine 122 includes a query creation module 204 that generates a set of queries 202(1)-202(N) (each of which is referred to individually herein as query 202) from message 220.

In some embodiments, query creation module 204 uses a large language model (LLM) and/or other techniques to convert message 220 into queries 202. For example, query creation module 204 could use tokenization, part-of-speech tagging, named entity recognition, topic modeling, sentiment analysis, object detection, semantic segmentation, object and/or gesture tracking, facial expression detection, pose estimation, and/or other machine learning and/or natural language processing (NLP) techniques to understand the structure and/or meaning of message 220, given the content of message 220 and/or previous messages in chat history 224. Query creation module 204 could input a prompt that includes message 220 and/or previous messages in chat history 224, additional information extracted via the machine learning and/or NLP techniques, and/or one or more instructions into the LLM. The instruction(s) could specify that the LLM is to generate one or more search queries 202 that help answer message 220.

An example prompt that is used by query creation module 204 to generate queries 202 includes the following:

{chat_history}

Create a search query for the character's memory that helps answer the last user message. You cannot ask for clarification. Provide only the query.

In the above example, "{chat_history}" is a placeholder for a representation of chat history 224, which can include (but is not limited to) a certain number of most recent messages exchanged between the user and virtual character, a summary of messages that predate the most recent messages in one or more conversations between the user and virtual character, and/or additional information associated with and/or extracted from message 220 and/or other messages in chat history 224 (e.g., named entities, parts of speech, sentiments, topics, objects, etc.).

The prompt used by query creation module 204 to generate queries 202 can also, or instead, instruct the LLM to generate multiple queries 202 to help answer message 220, given the content of message 220, a representation of chat history 224, and/or additional information associated with and/or extracted from message 220 and/or other messages in chat history 224. This prompt can specify different types of queries 202 to be generated from the provided information; guidelines and/or rules for converting the provided information into queries 202; the generation of a different query for a different grouping of one or more topics, entities, objects, gestures, facial expressions, and/or sentiments identified in the provided information; and/or other information that can be used to generate queries 202 that pertain to different aspects and/or interpretations of message 220.

Management engine 122 also converts each query 202 (1)-202(N) into a corresponding embedding 212(1)-212(N) (each of which is referred to individually herein as embedding 212). For example, management engine 122 could use a text embedding model, image embedding model, audio embedding model, multimodal embedding model, and/or another type of embedding model to convert each query 202 into a corresponding embedding 212 in a lower-dimensional vector space.

Retrieval engine 124 matches message 220 to a set of memories 214(1)214(Y) (each of which is referred to individually herein as memory 214) using embeddings 212 of queries 202. As shown in FIG. 2, a matching module 206 in retrieval engine 124 matches embeddings 212 to a set of embeddings 210(1)-210(K) (each of which is referred to individually herein as embedding 210) for a set of memories 214(1)-214(Y) (each of which is referred to individually herein as memory 214) associated with the virtual character.

More specifically, matching module 206 uses embeddings 210 to perform a lookup of memories 214 derived from a set of knowledge sources 222(1)-222(X) (each of which is referred to individually herein as knowledge source 222). Each knowledge source 222 represents a different type of memory associated with the virtual character and/or a different source of memories for the virtual character. For example, different knowledge sources 222 could correspond to different types of content (e.g., articles, books, scripts, character descriptions, storyboards, graphic novels, etc.), data sources (e.g., repositories, websites, libraries, conversations with users, etc.), and/or data (e.g., text, images, video, audio, biometric data, etc.).

In one or more embodiments, memories associated with the virtual character are generated by retrieval engine 124 and/or another component from "chunks" of data (e.g., text) associated with knowledge sources 222. As described in further detail below, each chunk of data can include one or more "facts," where each fact represents a discrete unit of information associated with the virtual character.

Figure 3B:
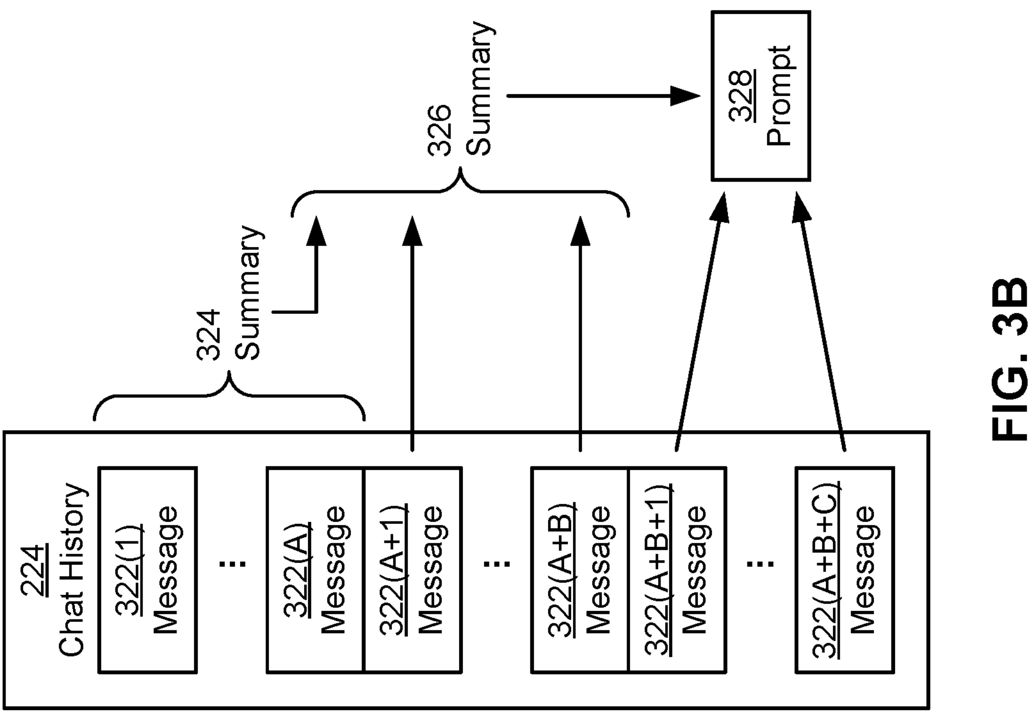
FIG. 3B illustrates the conversion of a chat history associated with a virtual character into a representation that is included in a prompt, according to various embodiments.
Figure 3A:
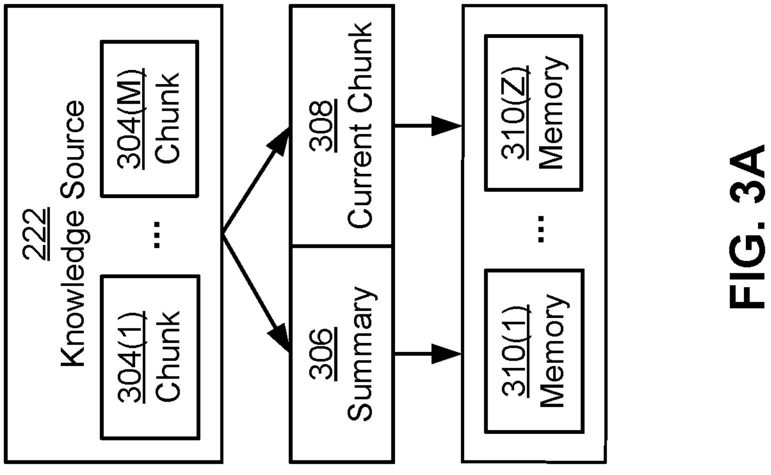
FIG. 3A illustrates the generation of a set of memories for a virtual character, according to various embodiments.

FIG. 3A illustrates the generation of a set of memories 310(1)-310(Z) (each of which is referred to individually herein as memory 310) for a virtual character, according to various embodiments. As mentioned above, memories 310 can be generated from chunks 304(1)-304(M) (each of which is referred to individually herein as chunk 304) of data into which a given knowledge source 222 is divided. For example, chunks 304 could include discrete sentences, paragraphs, chapters, and/or other units of data into which text from knowledge source 222 is divided. In another example, chunks 304 could include subsets of pixels that represent different objects, textures, grid cells, visual features, and/or other subsets of information associated with an image and/or video corresponding to knowledge source 222. In a third example, chunks 304 could include fixed- and/or variable-length intervals of time from synthesized and/or recorded audio and/or video corresponding to knowledge source 222. These intervals could correspond to individual utterances, shots, scenes, sound effects, musical segments, and/or other subsets of audio and/or video included in knowledge source 222.

After knowledge source 222 is divided into chunks 304, memories 310 are generated from individual chunks 304. In particular, one or more memories 310 can be extracted from a current chunk 308 that is combined with a summary 306 of additional chunks 304 from knowledge source 222. For example, summary 306 could be generated by prompting an LLM (or another machine learning model with summarization capabilities) with (i) one or more chunks 304 that precede current chunk 308 within knowledge source 222 and (ii) one or more instructions to summarize the inputted chunks. Summary 306 thus provides additional information that can be used to understand references and/or dependencies in current chunk 308.

In some embodiments, memories 310 extracted from a given current chunk 308 and a corresponding summary 306 represent discrete "facts" that correspond to units of information related to the virtual character. For example, memories 310 could be generated by prompting an LLM and/or another machine learning model with current chunk 308, summary 306, and one or more instructions to extract facts from current chunk 308 and summary 306 (e.g., in the form of a bulleted list, a structured data format, etc.). Facts outputted by the machine learning model in response to the prompt could then be post-processed by resolving references (e.g., pronouns) and/or verifying that each fact can be atomically understood (e.g., without additional context). Each fact could then be converted into a corresponding memory.

Returning to the discussion of FIG. 2, each memory extracted from a given knowledge source 222 can be represented using (i) a corresponding fact related to the virtual character, (ii) an embedding (e.g., embedding 210) of the fact, and (iii) metadata related to the memory. This representation can be stored in a database and/or another type of data store for subsequent retrieval and use. Consequently, memories extracted from knowledge source 222 can be used to augment a virtual character with information about the virtual character, the world inhabited by the virtual character, experiences of the virtual character, and/or other aspects of long-term memory for the virtual character.

The embedding included in a given memory can be generated by an embedding model from a representation of the fact. For example, the embedding could be generated by inputting text, image data, audio data, video data, and/or another type of data corresponding to the fact into an embedding model and obtaining the embedding as the output of one or more intermediate layers in the embedding model.

The metadata included in a given memory can specify additional information related to the memory. For example, the metadata could include (but is not limited to) a unique identifier for the memory, a unique identifier for the virtual character, the recency of the memory (e.g., a timestamp of the most recent access or update to the memory), an importance of the memory (e.g., a score representing the relevance or value of the memory to the behavior and/or experience of the virtual character), a trustworthiness and/or credibility of the corresponding knowledge source 222, a user preference (e.g., information related to the interests of the user and/or past interactions involving the user), and/or a level of retention (e.g., a score indicating the ability of the virtual character to recall and/or retain the memory). The metadata could also, or instead, include an emotional state (e.g., sentiment, mood, etc.) associated with the memory, topics or themes associated with the memory (e.g., entities, objects, locations, actions, colors, smells, sounds, imagery, etc.), and/or other information that can be used to match the memory to message 220 and/or queries 202. This information can be incorporated into the embedding of the fact and/or stored in one or more additional embeddings associated with the memory.

In one or more embodiments, the level of retention of a given memory by the virtual character is determined using a forgetting model with the following representation:

$$R = e^{-\frac{dt}{s}} \tag{1}$$

In the above equation, $R \in (0,1)$ represents the level of retention, $t \in \mathbb{R}^+$ denotes the elapsed time since the most recent access to the memory, $S \in \mathbb{R}^+$ represents the stability of the memory (e.g., how strong the memory is), and $d \in \mathbb{R}^+$ is a decay constant that defines the forgetfulness of the virtual character. Each time the memory is accessed, the stability S can be updated by multiplying with a boost factor $b \in \mathbb{R}^+$. The boost factor thus determines how quickly the virtual character is capable of learning and/or how quickly memories can be strengthened through repetition. The values of R, t, S, d, and/or b can be stored in metadata for the memory. These values can be customized, adjusted, and/or updated for individual memories and/or virtual characters to control the retrieval of the memories by the virtual characters and/or the behavior of the virtual characters over time.

The stability S can be used to represent the importance of a memory. For example, S could be set to a high number for core memories from a trusted source to effectively disable forgetting by the virtual character. Conversely, S could initially be set to a lower number for memories created from past user conversations, thereby allowing these memories to disappear sooner if there is a lack of access.

In some embodiments, matching module 206 matches embeddings 212 of queries 202 to embeddings 210 of memories 214 extracted from knowledge sources 222. For example, matching module 206 could use a vector database to perform a k-nearest-neighbors search for embeddings 210 of memories 214 that are closest to and/or within a threshold distance of embeddings 212 of queries 202 in a corresponding vector space. Embeddings 212 returned by the search would be semantically similar to one or more queries 202 and could be used by matching module 206 and/or another component of retrieval engine 124 to retrieve the corresponding memories 214 (e.g., a given memory 214 with an embedding that matches one or more embeddings 212, one or more memories 214 with topics and/or themes that match queries 202, etc.).

A ranking module 208 in retrieval engine 124 generates a ranking 218 of memories 214(1)-214(Y) matched to queries 202 based on a set of factors 216(1)-216(Y) (each of which is referred to individually herein as factors 216) associated with each memory 214. In one or more embodiments, factors 216 are generated from and/or include some or all metadata stored in memories 214. For example, factors 216 for a given memory 214 could include the level of retention and/or importance of that memory 214, the trustworthiness and/or credibility of the corresponding knowledge source 222, a user preference for or against that memory 214, and/or other metadata for that memory 214. Factors 216 could also, or instead, include a similarity (e.g., cosine similarity and/or another measure of vector similarity) between a given memory 214 and one or more queries 202, the extent to which the current emotional state of the virtual character matches the emotional state associated with that memory 214, the extent to which that memory 214 and/or a corresponding knowledge source 222 matches the progression of a story involving the virtual character and/or user, and/or other values that are derived from a combination of metadata for that memory 214 and additional information related to the interaction between the virtual character and the user.

In some embodiments, ranking module 208 generates ranking 218 of memories 214 using a score that includes a weighted combination of factors 216 for a given memory 214:

$$R \cdot \sum_{i=1}^{y} w_i \cdot x_i \tag{2}$$

In the above equation, R represents the level of retention discussed above with respect to Equation 1, $x_i$ is the ith factor, and $w_i$ is a weight associated with the ith factor. The score thus represents a measure of overall importance or relevance of the corresponding memory 214 to message 220 and/or one or more queries 202. The level of retention can be omitted from the weighted combination so that the virtual character is allowed to recall a forgotten memory (e.g., in the case of R=0) independent of other factors 216.

After ranking 218 is generated, retrieval engine 124 uses ranking 218 to select one or more memories 230 as a subset of the retrieved memories 214. Retrieval engine 124 also transmits the selected memories 230 to management engine 122. For example, retrieval engine 124 could order memories 214 within ranking 218 by descending score. Retrieval engine 124 could then return a certain number of the highest-ranked memories and/or a variable number of highest-ranked memories with scores that meet or exceed a threshold to management engine 122.

Management engine 122 generates one or more prompts 240 that include the returned memories 230, a representation of chat history 224, one or more instructions 226, and/or a character description 242. In one or more embodiments, the representation of chat history 224 includes (i) a certain number of the most recent messages between the user and the virtual character and (ii) a summary of older messages between the user and virtual character, as discussed in further detail below with respect to FIG. 3B.

FIG. 3B illustrates the conversion of chat history 224 associated with a virtual character into a representation that is included in a prompt 328, according to various embodiments. As shown in FIG. 3B, chat history 224 includes a sequence of messages 322(1)-322(A), 322(A+1)-322(A+B), and 322(A+B+1)-322(A+B+C) (each of which is referred to individually herein as message 322) ordered by time.

As chat history 224 is updated with messages 322, one or more summaries 324 and 326 are generated from older messages 322 in chat history 224. More specifically, a certain number of the earliest messages 322 (e.g., messages 322(1)-322 (A)) in chat history 224 can be converted into an initial summary 324. For example, summary 324 could be generated by prompting an LLM (or another type of machine learning model with summarization capabilities) with (i) these earliest messages and (ii) one or more instructions to generate a summary of these messages.

After a certain number of additional messages 322 (e.g., messages 322(A+1)-322 (A+B)) have been added to chat history 224, summary 324 is combined with these additional messages 322 into an updated summary 326. Continuing with the above example, summary 326 could be generated by prompting the LLM and/or machine learning model with (i) summary 324, (ii) the additional messages 322, and (iii) one or more instructions to generate a new summary 326 from the older summary 324 and additional messages 322. This process can be repeated periodically and/or continually (e.g., at a certain frequency and/or after a certain number of additional messages 322 has been added to chat history 224) to generate an updated summary 326 that acts as a form of short-term memory for the virtual character.

Summary 326 and a certain number of most recent messages 322 (e.g., messages 322(A+B+1)-322(A+B+C)) in chat history 224 are included in prompt 328. For example, prompt 328 could include the C most recent messages 322 between the user and virtual character and summary 326 of all older messages in chat history 224.

Returning to the discussion of FIG. 2, character description 242 includes information related to the identity, personality, and/or expression of the virtual character. For example, character description 242 could include a name of the virtual character; an image, three-dimensional (3D) model, and/or another visual or graphical depiction of the virtual character; facial expressions and/or poses of the virtual character; audio attributes that characterize the voice of the virtual character; personality attributes of the virtual character; the demeanor and/or attitude of the virtual character; accents, languages, slang, words, cadences, and/or sentence patterns used by the virtual character; distributions of emotional states associated with the virtual character; and/or other information that can be used to create a persona for the virtual character.

Instructions 226 can be used to guide the generation of output by a machine learning model 200 based on memories 230, chat history 224, and character description 242. For example, instructions 226 could direct an LLM and/or another type of machine learning model 200 to simulate a virtual character, answer the most recent message 220 from the user, answer the most recent message 220 from the user in a way that aligns with the character name and persona included in character description 242, and/or use memories 230 and/or chat history 224 to answer the most recent message 220 from the user.

In some embodiments, management engine 122 generates multiple prompts 240 for a given message 220 from the user. These prompts 240 can include one or more prompts with instructions 226 to answer message 220 using character description 242, chat history 224, and/or memories 230, as discussed above. These prompts 240 can additionally include one or more additional prompts with instructions 226 to answer message 220 in an evasive manner. For example, these additional prompts 240 could include instructions 226 to answer message 220 in a vague and/or indirect manner, change the subject (e.g., to a topic that can be found in chat history 224, character description 242, and/or memories 230), and/or generate an answer that is tangentially related to message 220 without directly addressing message 220. These instructions 226 could also, or instead, specify that the answer is to incorporate humor, rhetorical questions, anecdotes, and/or other conversational tactics that maintain engagement with the user without directly answering message 220. These instructions 226 could also, or instead, specify that the virtual character is to admit an inability to directly answer message 220 when information needed to answer message 220 cannot be found in character description 242, chat history 224, and/or memories 230.

After a given prompt that includes instructions 226, chat history 224, character description 242, and memories 230 is generated, management engine 122 inputs the prompt into machine learning model 200. Management engine 122 also receives one or more response candidates 238 generated by machine learning model 200 based on the inputted prompt. For example, management engine 122 could input the same prompt one or more times into machine learning model 200 and obtain one or more response candidates 238 as corresponding output of machine learning model 200. Each instance in which prompt is inputted into machine learning model 200 could be associated with a corresponding temperature hyperparameter, which could be the same across instances and/or varied from instance to instance.

A routing module 234 in management engine 122 selects a single response 236 to message 220 from a set of response candidates 238 generated by machine learning model 200 based on the inputted prompts 240. For example, routing module 234 could select response 236 based on the relevance of each response candidate to the retrieved memories 230, the quality of each response candidate, the predicted level of user engagement associated with each response candidate, the alignment of each response candidate with user preferences and/or the emotional state of the virtual character, the extent to which each response candidate aligns with the persona of the virtual character and/or advances a storyline associated with the virtual character, and/or other criteria. Some or all of these criteria could be determined using one or more machine learning models, human reviewers, rules, heuristics, and/or other techniques.

In one or more embodiments, routing module 234 selects response 236 from (i) an evasive response candidate generated by machine learning model 200 from a prompt with instructions 226 to answer message 220 in an evasive manner and (ii) a "default" response candidate generated by machine learning model 200 from a prompt with instructions 226 to answer message 220 in a non-evasive manner. Criteria for selecting response 236 can depend on (i) whether the user is asking for factual information in message 220 and (ii) whether the request for factual information can be answered using chat history 224, character description 242, and/or memories 230. If routing module 234 determines (e.g., via prompting of an LLM using chain-of-thought prompting, examples, and/or a "fact-checking" persona) that an answer to a factual question in message 220 cannot be determined using chat history 224, character description 242, and/or memories 230, routing module 234 selects the evasive response candidate as response 236. If routing module 234 determines that message 220 does not include a factual question and/or an answer to a factual question in message 220 can be found within chat history 224, character description 242, and/or memories 230, routing module 234 selects the default response candidate as response 236.

After response 236 to message 220 is selected by routing module 234, management engine 122 transmits response 236 over interface 232 to the user. For example, management engine 122 could transmit response 236 as text, synthesized voice output, one or more images, video, an animation, and/or another representation of the virtual character.

Figure 4:
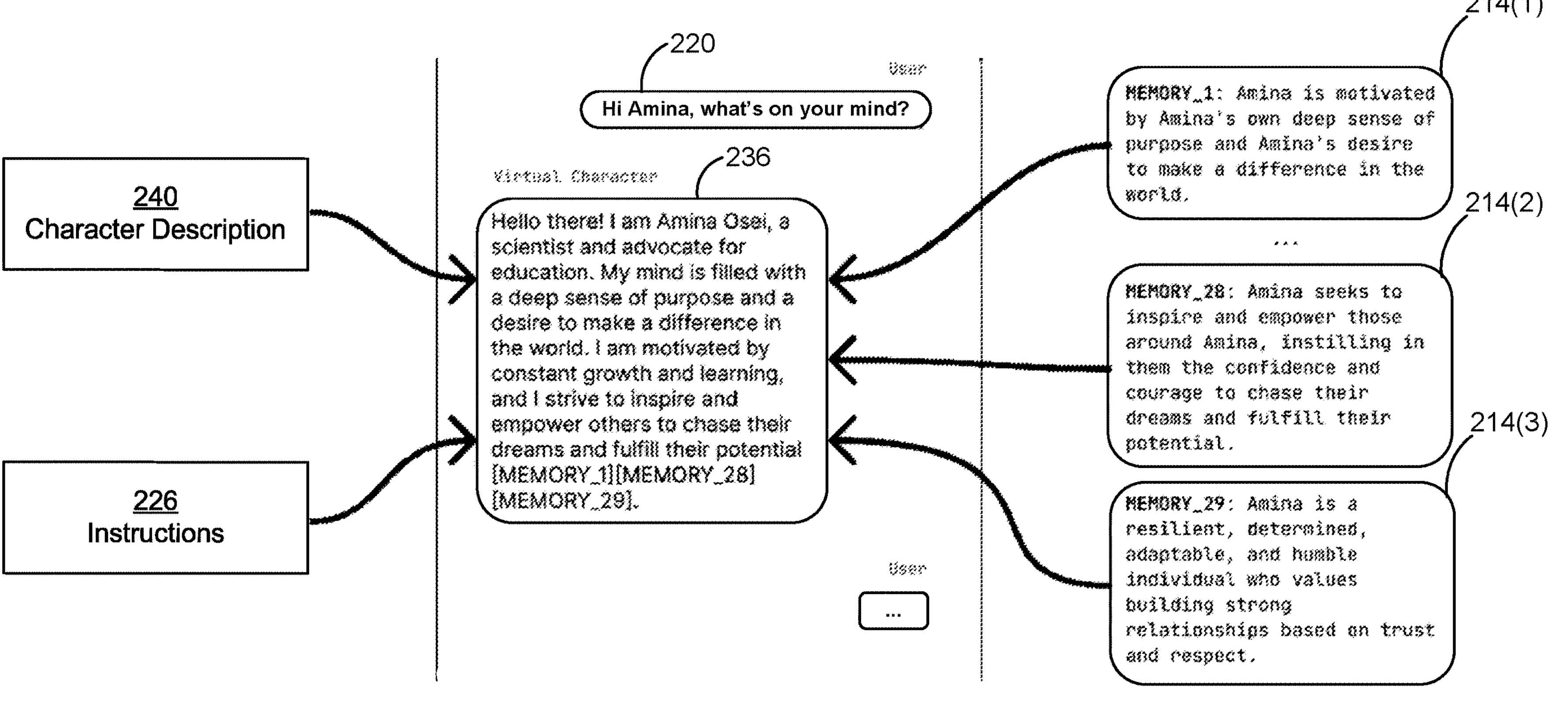
FIG. 4 illustrates the generation of an example response by a virtual character to a corresponding message from a user, according to various embodiments.

FIG. 4 illustrates the generation of an example response 236 by a virtual character to a corresponding message 220 from a user, according to various embodiments. As shown in FIG. 4, message 220 includes text of "Hi Amina, what's on your mind?"

Response 236 is generated based on character description 242, instructions 226, and a set of memories 214(1)-214(3) that are associated with the virtual character and matched to message 220. More specifically, response 236 includes an introduction to a virtual character named "Amina Osei" that incorporates information from character description 242 (e.g., "I am Amina Osei, a scientist and advocate for education"), memory 214(1) (e.g., "My mind is filled with a deep sense of purpose and a desire to make a difference in the world"), memory 214(2) (e.g., "I strive to inspire and empower others to chase their dreams and fulfill their potential"), and memory 214(3) (e.g., "I am motivated by constant growth and learning"). Grounding of response 236 in character description 242, instructions 226, and memories 214(1)-214(3) thus allows response 236 to address message 220 in a way that aligns with the behavior, personality, values, and/or experiences of the virtual character.

Returning to the discussion of FIG. 2, in some embodiments, management engine 122 and retrieval engine 124 include functionality to cause the virtual character to proactively transmit a message to the user without receiving a corresponding message (e.g., message 220) from the user. More specifically, management engine 122 can generate and transmit a new message over interface 232 to the user upon detecting a trigger 228.

In some embodiments, trigger 228 is associated with a lack of activity from the user over a pre-specified period of time. For example, trigger 228 could be set to a certain interval (e.g., 15 seconds) with a randomized deviation (e.g., up to 5 seconds) to avoid overtly mechanical behavior in the virtual character. Trigger 228 could also, or instead, be associated with a certain probability of occurrence. At a given interval (e.g., every fraction of a second to a certain number of seconds), the probability is used to determine whether or not trigger 228 has occurred (e.g., by sampling from a distribution, generating a random number, etc.).

Once trigger 228 has occurred, management engine 122 can determine whether or not to proactively transmit a message to the user from the virtual character. For example, management engine 122 could determine that the virtual character is to proactively message the user if the user is not typing, the chat history is empty, a certain period of time has lapsed since the last message in the conversation between the user and the virtual character, the last message in the conversation is from the user, and/or other criteria are met. In another example, management engine 122 could use machine learning techniques to determine whether or not to proactively transmit a message from the virtual character to the user, given factors such as (but not limited to) preferences of the user, the emotional state of the virtual character, the point in a storyline involving the virtual character that corresponds to the most recent message in the conversation, and/or the duration of the conversation.

Upon deciding to proactively transmit a message to the user from the virtual character, management engine 122 generates one or more prompts 240 that include one or more agendas associated with the virtual character. For example, these prompts 240 could instruct machine learning model 200 to generate a message from the virtual character that incorporates character description 242, chat history 224, and/or memories 230; acquires information about the user; advances the storyline involving the virtual character; and/or engages the user in an interesting conversation about a previously discussed topic and/or a new topic in which the user might be interested. These prompts 240 may also, or instead, include instructions to reengage the user via a reminder of an unfinished conversation, a new piece of information and/or memory related to the virtual character, and/or an invitation to participate in an activity or challenge.

Management engine 122 inputs these prompts 240 into machine learning model 200 and obtains one or more proactive response candidates 238 as corresponding output of machine learning model 200. Management engine 122 also uses routing module 234 to select a proactive response 236 to be transmitted to the user from the proactive response candidates 238. The selection criteria for the proactive response can include factors such as (but not limited to) the relevance of a given response candidate to the conversation, the likelihood of re-engaging the user using a given response candidate, the extent to which a given proactive response candidate is consistent with the persona of the virtual character, and/or the extent to which a given proactive response candidate aligns with the agenda specified in a corresponding prompt.

After the proactive response 236 is selected, management engine 122 causes the proactive response 236 to be outputted to the user over interface 232. This proactive interaction can thus be used to maintain the interest of the user in the virtual character and/or the conversation with the virtual character.

Management engine 122 and retrieval engine 124 can continue the conversation between the virtual character and the user by generating and transmitting a different response 236 to each message 220 received from the user and/or generating and transmitting a proactive response 236 based on a corresponding trigger 228. Management engine 122 and/or retrieval engine 124 can additionally generate and/or store new memories for the virtual character based on messages exchanged between the user and the virtual character.

For example, management engine 122 could update one or more data stores with memories corresponding to subsets of messages in the conversation (e.g., one or more "facts" extracted from a message in the conversation), individual messages in the conversation (e.g., a memory that includes the content of a message and/or a summary of the message), summaries (e.g., summaries 324 and/or 326 of FIG. 3B) that span various messages in the conversation, and/or a summary of the entire conversation. Each memory could be stored with metadata that specifies the virtual character, user, conversation, recency of the memory, the importance of the memory, a source of the memory, one or more preferences associated with the user, an emotional state associated with the virtual character, a retention of the memory by the virtual character, one or more topics related to the memory, access controls and/or permissions associated with the memory (e.g., to limit discussion of the memory by the virtual character to the user and/or other "authorized" users), and/or other information that can be used to manage access to the memory by the virtual character and/or use of the memory by the virtual character. These memories allow previous interactions between the user and the virtual character to be added to the long-term memory of the virtual character and facilitates the personalization of subsequent interactions between the user and the virtual character.

Figure 5:
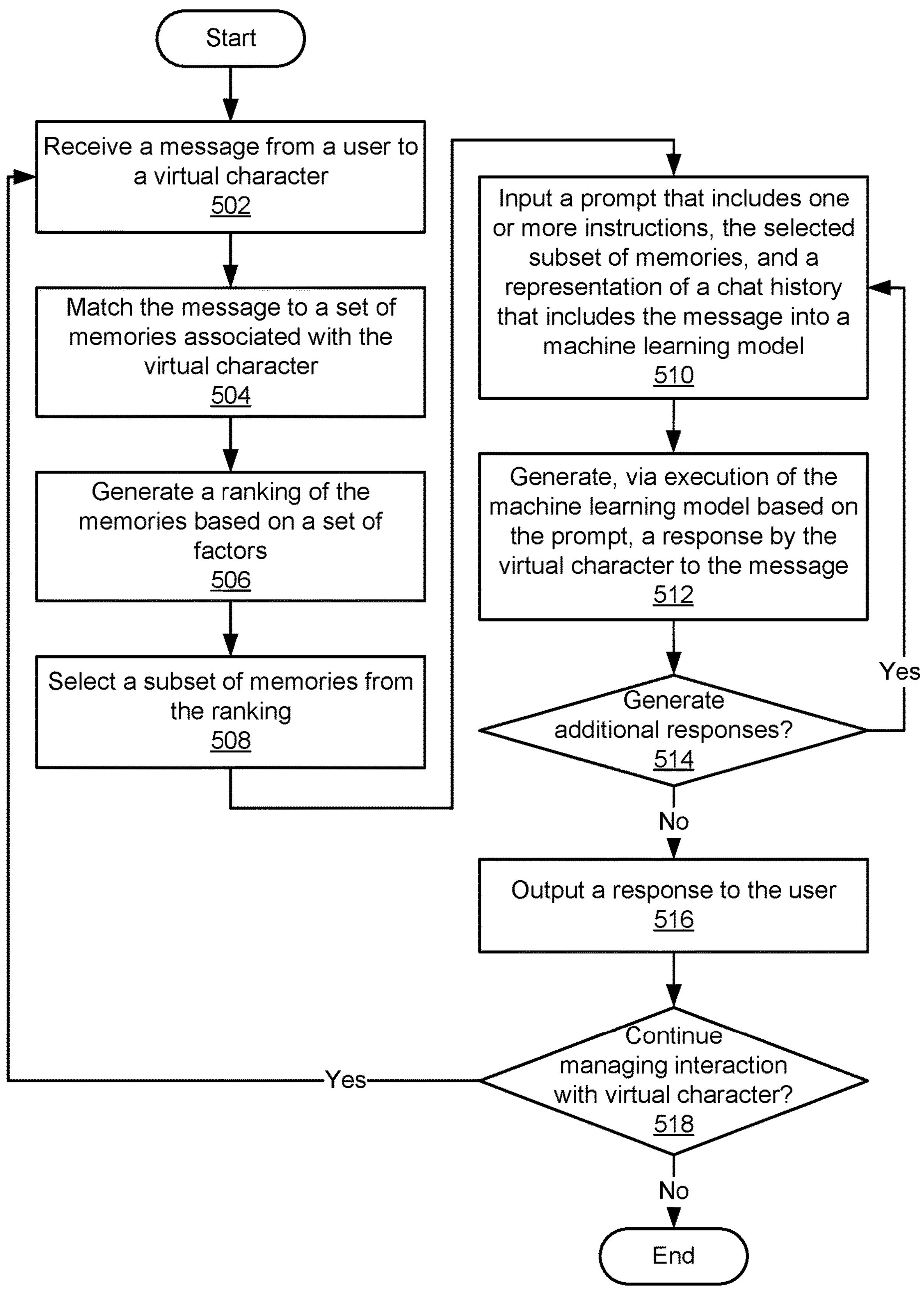
FIG. 5 is a flow diagram of method steps for synthesizing an interaction with a virtual character, according to various embodiments.

FIG. 5 is a flow diagram of method steps for synthesizing an interaction with a virtual character, according to various embodiments. Although the method steps are described in conjunction with the systems of FIGS. 1-2, persons skilled in the art will understand that any system configured to perform the method steps in any order falls within the scope of the present disclosure.

As shown, in step 502, management engine 122 receives a message from a user to a virtual character. For example, management engine 122 could receive the message in the form of text, audio, one or more images, video, and/or another type of data.

In step 504, management engine 122 and/or retrieval engine 124 match the message to a set of memories associated with the virtual character, as described in further detail below with respect to FIG. 6.

In step 506, retrieval engine 124 generates a ranking of the memories based on a set of factors. For example, retrieval engine 124 could compute a score for each memory as a weighted combination of factors associated with the memory. These factors could include (but are not limited to) a similarity of a memory included in the first set of memories to a query associated with the first message, a recency of the memory, an importance of the memory, a source of the memory, one or more preferences associated with the user, an emotional state associated with the virtual character, and/or a retention of the memory by the virtual character. Retrieval engine 124 could also rank the memories by ascending and/or descending score.

In step 508, management engine 122 and/or retrieval engine 124 select a subset of memories from the ranking. Continuing with the above example, management engine 122 and/or retrieval engine 124 could select a certain number of the highest-ranked memories and/or a variable number of memories with scores that meet or exceed a threshold from the ranking.

In step 510, management engine 122 inputs a prompt that includes one or more instructions, the selected subset of memories, and a representation of a chat history that includes the message into a machine learning model. For example, management engine 122 could generate the representation of the chat history as a certain number of the most recent messages in the interaction and a summary of some or all older messages in the interaction. Management engine 122 could also generate a prompt that includes the representation of the chat history, the selected memories, a character name, a character description, an instruction to simulate a virtual character, an instruction to answer a most recent message from the user, and/or an instruction to use the one or more memories to generate the response. Management engine 122 could then transmit the prompt to the machine learning model.

In step 512, management engine 122 generates, via execution of the machine learning model, a response by the virtual character to the message. For example, management engine 122 could obtain the response from output generated by the machine learning model based on the prompt inputted in step 510.

In step 514, management engine 122 determines whether or not to generate additional responses to the message. For example, management engine 122 could determine that additional responses to the message are to be generated until a certain number of responses is reached, one or more types of responses (e.g., evasive, default, etc.) have been generated, and/or other criteria are met.

While management engine 122 determines that additional responses to the message are to be generated, management engine 122 repeats steps 510 and 512 to generate the additional responses. For example, management engine 122 could use different instructions, temperature hyperparameters, subsets of retrieved memories, character descriptions, and/or other parameters to vary the responses generated by the machine learning model.

After management engine 122 determines in step 514 that no additional responses to the message are to be generated, management engine 122 performs step 516, in which management engine 122 outputs a response the user. For example, management engine 122 could select the response from a set of responses generated using steps 510, 512, and 514 based on the relevance each response candidate to the retrieved memories 230, the quality of each response candidate, the predicted level of user engagement associated with each response candidate, the alignment of each response candidate with user preferences and/or the emotional state of the virtual character, the extent to which each response candidate aligns with the persona of the virtual character, the ability of the virtual character to answer a factual question in the message, and/or other criteria. Management engine 124 could then output the response as text, audio, one or more images, video, and/or another format.

In step 518, management engine 124 determines whether or not to continue managing the interaction with the virtual character. For example, management engine 124 could determine that interaction with the virtual character should continue to be managed while the user interacts with the virtual character and/or while the virtual character is available for interaction with one or more users. While management engine 122 determines that interaction with the virtual character should continue to be managed, management engine 122 and retrieval engine 124 repeat steps 502, 504, 506, 508, 510, 512, 514, 516, and 518 to continue generating responses to messages from the user. Management engine 122 and retrieval engine 124 can also, or instead, perform one or more steps 502, 504, 506, 508, 510, 512, 514, 516, and/or 518 to generate proactive responses from the virtual character to the user based on triggers and/or other criteria, as discussed above. Management engine 122 and retrieval engine 124 can continue managing the interaction between the user and the virtual character until the interaction is discontinued and/or the virtual character is no longer available for interactions with one or more users.

Figure 6:
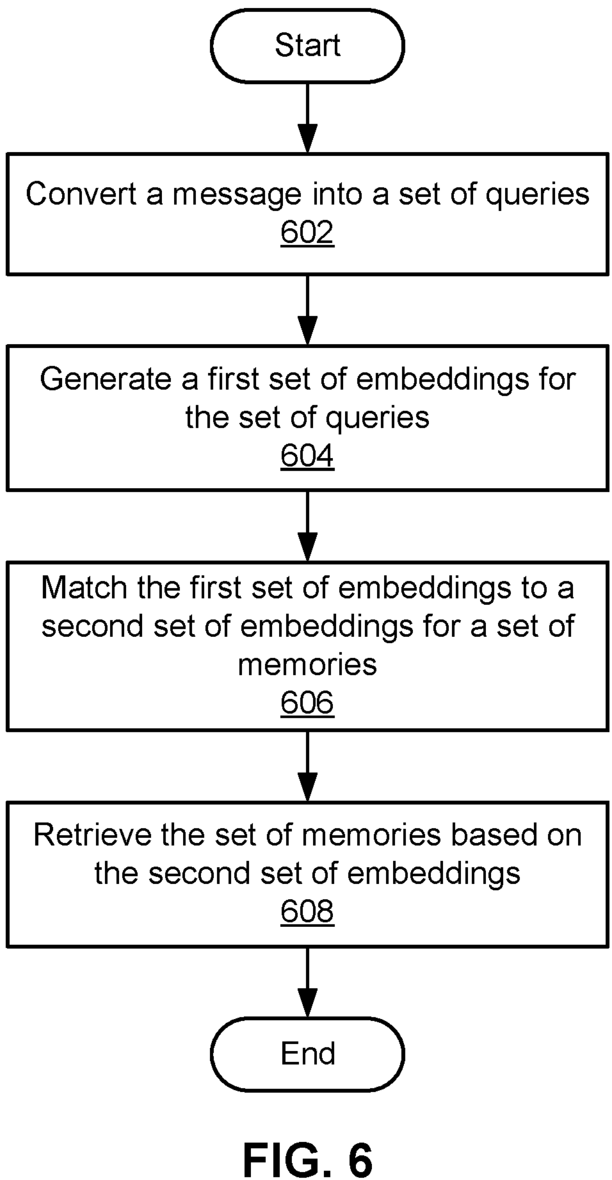
FIG. 6 is a flow diagram of method steps for matching a message from a user to a set of memories associated with a virtual character, according to various embodiments.

FIG. 6 is a flow diagram of method steps for matching a message from a user to a set of memories associated with a virtual character, according to various embodiments. Although the method steps are described in conjunction with the systems of FIGS. 1-2, persons skilled in the art will understand that any system configured to perform the method steps in any order falls within the scope of the present disclosure.

As shown, in step 602, management engine 122 converts the message into a set of queries. For example, management engine 122 could use tokenization, part-of-speech tagging, named entity recognition, topic modeling, sentiment analysis, and/or other machine learning and/or NLP techniques to understand the structure and/or meaning of the message. Management engine 122 could also input a prompt that includes the message, previous messages in a chat history between the user and the virtual character, information extracted via the NLP and/or machine learning techniques, and/or one or more instructions into an LLM. The instruction(s) could specify that the LLM is to generate one or more search queries that help answer message, different types of queries to be generated from the provided information, guidelines and/or rules for converting the provided information into queries, the generation of a different query for each topic identified in the provided information, and/or other information that can be used to generate queries that pertain to different aspects and/or interpretations of the message. Management engine 122 could then obtain the queries as output of the LLM.

In step 604, management engine 122 generates a first set of embeddings for the first set of queries. For example, management engine 122 could use one or more embedding models to convert the first set of queries into the first set of embeddings.

In step 606, retrieval engine 124 matches the first set of embeddings to a second set of embeddings for a set of memories. For example, retrieval engine 124 could perform one or more searches of a vector database using the first set of embeddings. Each search could be used to retrieve a certain number of embeddings for memories that are close to a given embedding for a query in a latent embedding space.

In step 608, retrieval engine 124 retrieves the set of memories based on the second set of embeddings. For example, retrieval engine 124 could perform a lookup of one or more data stores using the second set of embeddings to retrieve the corresponding memories. The retrieved memories can then be used to generate a response to the message that is aligned with the personality, behavior, and/or experiences of the virtual character, as discussed above.

In sum, the disclosed techniques manage an interaction between a user and a virtual character by generating messages from the virtual character that are grounded in the memories, behavior, and/or personality of the virtual character. Memories of the virtual character are extracted from knowledge sources such as articles, books, scripts, character descriptions, images, audio, video, and/or other types of information associated with the virtual character. Each message from the user is matched to a set of relevant memories of the virtual character. A default response to the message is generated by prompting an LLM and/or another machine learning model with the relevant memories, a chat history that includes the message, a description of the character, and/or one or more instructions to respond to the message as the virtual character. The machine learning model can also be prompted to generate an evasive response that does not directly address the content of the message. The evasive response can be transmitted to the user when the virtual character is unable to answer a factual question in the message using the description of the character, the relevant memories, and/or chat history. The default response can be transmitted to the user when the message does not include a factual question and/or a factual question in the message can be answered using the description of the character, the relevant memories, and/or chat history.

One technical advantage of the disclosed techniques relative to the prior art is the ability to tailor the interaction between a user and a virtual character to different conversational topics, emotional states, user preferences, and/or virtual character personas. Consequently, the disclosed techniques allow the interaction to be more dynamic, spontaneous, and natural than existing approaches that rely on scripted dialogue trees or flows. Another advantage of the disclosed techniques is the ability to ground responses from the virtual character in memories and/or attributes of the character, thereby avoiding hallucinations and/or other inconsistencies in output from LLMs used to generate the responses. An additional technical advantage of the disclosed techniques is the adaptation of Retrieval-Augmented Generation (RAG) techniques that are used to answer factual questions to the generation of messages that are in line with the personas, experiences, and worlds of virtual characters. These technical advantages provide one or more technological improvements over prior art approaches.

1. In some embodiments, a computer-implemented method for synthesizing an interaction with a virtual character comprises matching a first message from a user to a first set of memories associated with the virtual character; determining at least a portion of the first set of memories based on a plurality of factors associated with the first set of memories; inputting a first prompt that includes (i) one or more instructions associated with the virtual character, (ii) the at least a portion of the first set of memories, and (iii) the first message into a machine learning model; generating, via execution of the machine learning model based on the first prompt, a first response by the virtual character to the first message; and causing the first response to be outputted to the user.

2. The computer-implemented method of clause 1, further comprising matching a second message that is received from the user after the first response is outputted to the user to a second set of memories associated with the virtual character; inputting one or more additional prompts that include (i) at least a portion of the second set of memories, (ii) the first message, and (iii) the second message into the machine learning model; and causing a second response generated by the machine learning model based on the one or more additional prompts to be outputted to the user.

3. The computer-implemented method of any of clauses 1-2, further comprising receiving a plurality of responses generated by the machine learning model based on the one or more additional prompts, wherein the plurality of responses comprises a default response and an evasive response; and selecting the second response from the plurality of responses based on an ability of the virtual character to respond to the second message.

4. The computer-implemented method of any of clauses 1-3, further comprising evaluating the ability of the virtual character to respond to the second message based on an ability of the virtual character to answer a factual question included in the second message.

5. The computer-implemented method of any of clauses 1-4, wherein matching the first message to the first set of memories comprises converting the first message into a plurality of queries; and retrieving the first set of memories from one or more data stores based on the plurality of queries.

6. The computer-implemented method of any of clauses 1-5, wherein determining the at least a portion of the first set of memories comprises computing a set of scores for the first set of memories based on the plurality of factors; and determining the at least a portion of the first set of memories based on a ranking of the first set of memories by the set of scores.

7. The computer-implemented method of any of clauses 1-6, further comprising generating an additional memory of the virtual character based on the first message; and storing the additional memory in association with the virtual character.

8. The computer-implemented method of any of clauses 1-7, wherein the plurality of factors comprises at least one of a similarity of a memory included in the first set of memories to a query associated with the first message, a recency of the memory, an importance of the memory, a source of the memory, one or more preferences associated with the user, an emotional state associated with the virtual character, or a retention of the memory by the virtual character.

9. The computer-implemented method of any of clauses 1-8, wherein the one or more instructions comprise at least one of a character name, a character description, an instruction to simulate a virtual character, an instruction to answer a most recent message from the user, or an instruction to use the at least a portion of the first set of memories to generate the first response.

10. The computer-implemented method of any of clauses 1-9, wherein the machine learning model comprises a large language model.

11. In some embodiments, one or more non-transitory computer-readable media store instructions that, when executed by one or more processors, cause the one or more processors to perform the steps of matching a first message from a user to a first set of memories associated with a virtual character; generating a first ranking of the first set of memories based on one or more factors associated with the first set of memories; determining at least a portion of the first set of memories based on the first ranking; inputting a first prompt that includes (i) one or more instructions associated with the virtual character, (ii) the at least the portion of the first set of memories, and (iii) the first message into a machine learning model; generating, via execution of the machine learning model based on the first prompt, a first response by the virtual character to the first message; and causing the first response to be outputted to the user.

12. The one or more non-transitory computer-readable media of clause 11, wherein the instructions further cause the one or more processors to perform the steps of matching a second set of memories to a second message that is received from the user after the first response is outputted to the user; inputting a second prompt that includes (i) the second set of memories, (ii) the first message, and (iii) the second message into the machine learning model; and causing a second response generated by the machine learning model based on the second prompt to be outputted to the user.

13. The one or more non-transitory computer-readable media of any of clauses 11-12, wherein the second prompt further includes (i) the one or more instructions and (ii) a summary of one or more messages that precede the first message and the second message in an interaction between the user and the virtual character.

14. The one or more non-transitory computer-readable media of any of clauses 11-13, wherein matching the first message to the first set of memories comprises converting the first message into a plurality of queries; matching a first set of embeddings associated with the plurality of queries to a second set of embeddings for the first set of memories; and retrieving, from one or more data stores, the first set of memories using the second set of embeddings.

15. The one or more non-transitory computer-readable media of any of clauses 11-14, wherein converting the first message into the plurality of queries comprises generating, via a large language model, the plurality of queries based on a second prompt that includes (i) a chat history that includes the first message and (ii) one or more additional instructions to generate the plurality of queries based on the first message and the chat history.

16. The one or more non-transitory computer-readable media of any of clauses 11-15, wherein the instructions further cause the one or more processors to perform the steps of upon determining a lack of activity from the user over a prespecified period, inputting a second prompt that includes one or more additional instructions associated with the virtual character into the machine learning model; and causing a second response generated by the machine learning model based on the second prompt to be outputted to the user.

17. The one or more non-transitory computer-readable media of any of clauses 11-16, wherein generating the first ranking comprises computing a set of scores for the first set of memories, wherein each score included in the set of scores comprises a weighted combination of the one or more factors for a corresponding memory included in the first set of memories; and ranking the first set of memories by the set of scores.

18. The one or more non-transitory computer-readable media of any of clauses 11-17, wherein the one or more factors comprise at least one of a similarity of a memory included in the first set of memories to a query associated with the first message, a recency of the memory, an importance of the memory, a source of the memory, one or more preferences associated with the user, an emotional state associated with the virtual character, or a retention of the memory by the virtual character.

19. The one or more non-transitory computer-readable media of any of clauses 11-18, wherein the one or more instructions comprise at least one of a character name, a character description, an instruction to simulate a virtual character, an instruction to answer a most recent message from the user, or an instruction to use the first set of memories to generate the first response.

20. In some embodiments, a system comprises one or more memories that store instructions, and one or more processors that are coupled to the one or more memories and, when executing the instructions, are configured to perform the steps of matching a first message from a user to a set of memories associated with a virtual character; determining at least a portion of the set of memories based on a ranking of the set of memories by a set of scores associated with the set of memories; inputting a first prompt that includes (i) one or more instructions associated with the virtual character, (ii) the at least a portion of the set of memories, and (iii) the first message into a machine learning model; generating, via execution of the machine learning model based on the first prompt, a first response by the virtual character to the first message; and causing the first response to be outputted to the user.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for synthesizing an interaction with a virtual character, the method comprising:
performing, via one or more processors, the steps of:
matching a first message from a user to a first set of memories associated with the virtual character;
determining at least a portion of the first set of memories based on a plurality of factors associated with the first set of memories;
inputting a first prompt that includes (i) one or more instructions associated with the virtual character, (ii) the at least a portion of the first set of memories, and (iii) the first message into a machine learning model;
generating, via execution of the machine learning model based on the first prompt, a first response by the virtual character to the first message; and
causing the first response to be outputted to the user.

2. The computer-implemented method of claim 1, further comprising:
performing, via the one or more processors, the steps of:
matching a second message that is received from the user after the first response is outputted to the user to a second set of memories associated with the virtual character;
inputting one or more additional prompts that include (i) at least a portion of the second set of memories, (ii) the first message, and (iii) the second message into the machine learning model; and
causing a second response generated by the machine learning model based on the one or more additional prompts to be outputted to the user.

3. The computer-implemented method of claim 2, further comprising:
performing, via the one or more processors, the steps of:
receiving a plurality of responses generated by the machine learning model based on the one or more additional prompts, wherein the plurality of responses comprises a default response and an evasive response; and
selecting the second response from the plurality of responses based on an ability of the virtual character to respond to the second message.

4. The computer-implemented method of claim 3, further comprising performing, via the one or more processors, the step of evaluating the ability of the virtual character to respond to the second message based on an ability of the virtual character to answer a factual question included in the second message.

5. The computer-implemented method of claim 1, wherein matching the first message to the first set of memories comprises:
converting the first message into a plurality of queries; and
retrieving the first set of memories from one or more data stores based on the plurality of queries.

6. The computer-implemented method of claim 1, wherein determining the at least a portion of the first set of memories comprises:
computing a set of scores for the first set of memories based on the plurality of factors; and
determining the at least a portion of the first set of memories based on a ranking of the first set of memories by the set of scores.

7. The computer-implemented method of claim 1, further comprising:
performing, via the one or more processors, the steps of:
generating an additional memory of the virtual character based on the first message; and
storing the additional memory in association with the virtual character.

8. The computer-implemented method of claim 1, wherein the plurality of factors comprises at least one of a similarity of a memory included in the first set of memories to a query associated with the first message, a recency of the memory, an importance of the memory, a source of the memory, one or more preferences associated with the user, an emotional state associated with the virtual character, or a retention of the memory by the virtual character.

9. The computer-implemented method of claim 1, wherein the one or more instructions associated with the virtual character comprise at least one of a character name, a character description, an instruction to simulate the virtual character, an instruction to answer a most recent message from the user, or an instruction to use the at least a portion of the first set of memories to generate the first response.

10. The computer-implemented method of claim 1, wherein the machine learning model comprises a large language model.

11. One or more non-transitory computer-readable media storing instructions that, when executed by one or more processors, cause the one or more processors to perform the steps of:
matching a first message from a user to a first set of memories associated with a virtual character;
generating a first ranking of the first set of memories based on one or more factors associated with the first set of memories;
determining at least a portion of the first set of memories based on the first ranking;
inputting a first prompt that includes (i) one or more instructions associated with the virtual character, (ii) the at least the portion of the first set of memories, and (iii) the first message into a machine learning model;
generating, via execution of the machine learning model based on the first prompt, a first response by the virtual character to the first message; and
causing the first response to be outputted to the user.

12. The one or more non-transitory computer-readable media of claim 11, wherein the instructions further cause the one or more processors to perform the steps of:
matching a second set of memories to a second message that is received from the user after the first response is outputted to the user;
inputting a second prompt that includes (i) the second set of memories, (ii) the first message, and (iii) the second message into the machine learning model; and
causing a second response generated by the machine learning model based on the second prompt to be outputted to the user.

13. The one or more non-transitory computer-readable media of claim 12, wherein the second prompt further includes (i) the one or more instructions and (ii) a summary of one or more messages that precede the first message and the second message in an interaction between the user and the virtual character.

14. The one or more non-transitory computer-readable media of claim 11, wherein matching the first message to the first set of memories comprises:

converting the first message into a plurality of queries;

matching a first set of embeddings associated with the plurality of queries to a second set of embeddings for the first set of memories; and retrieving, from one or more data stores, the first set of memories using the second set of embeddings.

15. The one or more non-transitory computer-readable media of claim 14, wherein converting the first message into the plurality of queries comprises generating, via a large language model, the plurality of queries based on a second prompt that includes (i) a chat history that includes the first message and (ii) one or more additional instructions to generate the plurality of queries based on the first message and the chat history.

16. The one or more non-transitory computer-readable media of claim 11, wherein the instructions further cause the one or more processors to perform the steps of:

upon determining a lack of activity from the user over a prespecified period, inputting a second prompt that includes one or more additional instructions associated with the virtual character into the machine learning model; and causing a second response generated by the machine learning model based on the second prompt to be outputted to the user.

17. The one or more non-transitory computer-readable media of claim 11, wherein generating the first ranking comprises:

computing a set of scores for the first set of memories, wherein each score included in the set of scores comprises a weighted combination of the one or more factors for a corresponding memory included in the first set of memories; and ranking the first set of memories by the set of scores.

18. The one or more non-transitory computer-readable media of claim 11, wherein the one or more factors comprise at least one of a similarity of a memory included in the first set of memories to a query associated with the first message, a recency of the memory, an importance of the memory, a source of the memory, one or more preferences associated with the user, an emotional state associated with the virtual character, or a retention of the memory by the virtual character.

19. The one or more non-transitory computer-readable media of claim 11, wherein the one or more instructions associated with the virtual character comprise at least one of a character name, a character description, an instruction to simulate the virtual character, an instruction to answer a most recent message from the user, or an instruction to use the first set of memories to generate the first response.

20. A system, comprising:

one or more memories that store instructions, and one or more processors that are coupled to the one or more memories and, when executing the instructions, are configured to perform the steps of:

matching a first message from a user to a set of memories associated with a virtual character;

determining at least a portion of the set of memories based on a ranking of the set of memories by a set of scores associated with the set of memories;

inputting a first prompt that includes (i) one or more instructions associated with the virtual character, (ii) the at least a portion of the set of memories, and (iii) the first message into a machine learning model;

generating, via execution of the machine learning model based on the first prompt, a first response by the virtual character to the first message; and causing the first response to be outputted to the user.

* * * * *